Inventors
P. R.R. AIGRAIN
G. POULOT-INTZOPOULOS
By R. F. Morris
Attorney

*Inventors*
P. R. R. AIGRAIN-
G. POULOT-INTZOPOULOS
By [signature]
*Attorney*

Sept. 16, 1958 P. R. R. AIGRAIN ET AL 2,852,611

ELECTRONIC SWITCHING SYSTEM

Filed Jan. 28, 1954 4 Sheets-Sheet 3

*Inventors*
P. R. R. AIGRAIN-
G. POULOT-INTZOPOULOS
*By* [signature]
*Attorney*

Inventors
P. R.R. AIGRAIN-
G. POULOT- INTZOPOULOS
By R.P. Morris
Attorney

United States Patent Office 2,852,611

Patented Sept. 16, 1958

2,852,611

ELECTRONIC SWITCHING SYSTEM

Pierre Raoul Roger Aigrain and Georges Poulot-Intzopoulos, Paris, France, assignors to International Standard Electric Corporation, New York, N. Y., a corporation of Delaware Application January 28, 1954, Serial No. 406,766

Claims priority, application France February 12, 1953

10 Claims. (Cl. 179—18)

The present invention relates to electronic switching systems and more particularly such systems used in automatic switching systems.

In some automatic telephone systems, a call detecting device is provided which causes an available register to start the hunting for the calling line by a line finder by means of a link circuit connected to the register through a link circuit selector. In electronic switching systems, each line is characterized within a central exchange by a code and the call detecting device must transmit the code of the calling line to the line finder by means of the register circuit, the selector circuit for link circuits, and the link circuit, the line finder therefore operating in fact like a selector. In such systems, each register has access to a large number of link circuits by means of the link circuit selector, or there may even be several registers having access to the same link circuits.

One of the objects of the present invention is to provide a selector circuit for link circuits using electronic switching means.

According to one of the features of the invention, a selector circuit for link circuits comprises in combination, a plurality of link circuits, means for characterizing each available link circuit through the position of an impulse within a group of recurrent impulses, means for applying the said impulses characterizing the free link circuits to a common line in order to transmit them to the link circuit selecting circuit or circuits having access to the said link circuits, a register circuit comprising, for example, means for controlling a selection, electronic switching systems, such as those known under the name of "electronic gates," interconnecting the register circuit and the link circuits, means in the link circuit selector circuit adapted for selecting an impulse amongst the impulses characterizing the available link circuits and for causing the operation of the device connecting the said link circuit to the said register which may then control a selection through the said link circuit.

Other objects, features and advantages of the present invention will appear from a reading of the following description of an embodiment, the said description being given in conjunction with the annexed drawings in which.

Figure 1:
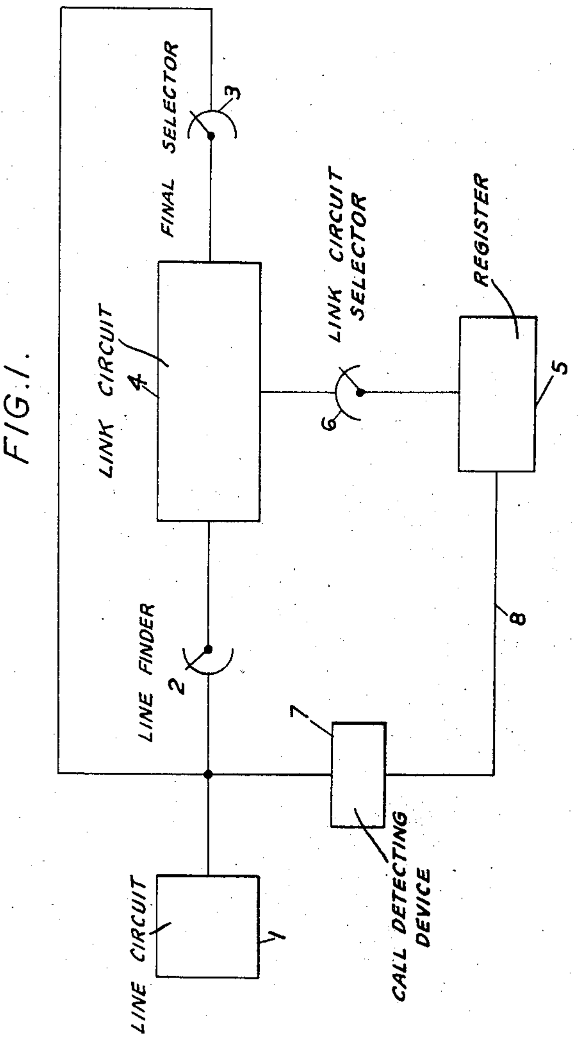
Fig. 1 represents a schematic diagram of a switching system according to features of the invention.

Fig. 1 represents the junction diagram of a switching system according to the invention. In 1 there is shown a line circuit connected on the one hand to a line finder 2, and on the other hand, to a line selector 3, which ahe interconnected by a link circuit 4. A register 5 has access to the different link circuits by means of a link circuit selector 6. The line circuits such as 1 are also connected to a call detecting device 7 common to a group of lines, 100 for example. When a line is calling, the detector 7 transmits to the register 5, through the link 8, the indication of the calling line code. The register 5 then causes the selector 6 to hunt for a free link circuit having access to the calling line. The indications thus obtained from the call detecting device 7 in the calling line code are then used for controlling the connection of the calling line circuit 1 to the link circuit 4, through the line finder 2.

An embodiment of a link circuit selecting circuit will now be described in connection with Figs. 2, 3 and 4. Each one of the link circuits of a group to which a link circuit selector has access is characterized on the one hand by a code—combination of impulses applied simultaneously—and on the other hand, by a position in time in a cycle of impulses, the code and the position of the time in the cycle corresponding to the position of the link circuit in the group in a biunivocal manner.

Figure 2:
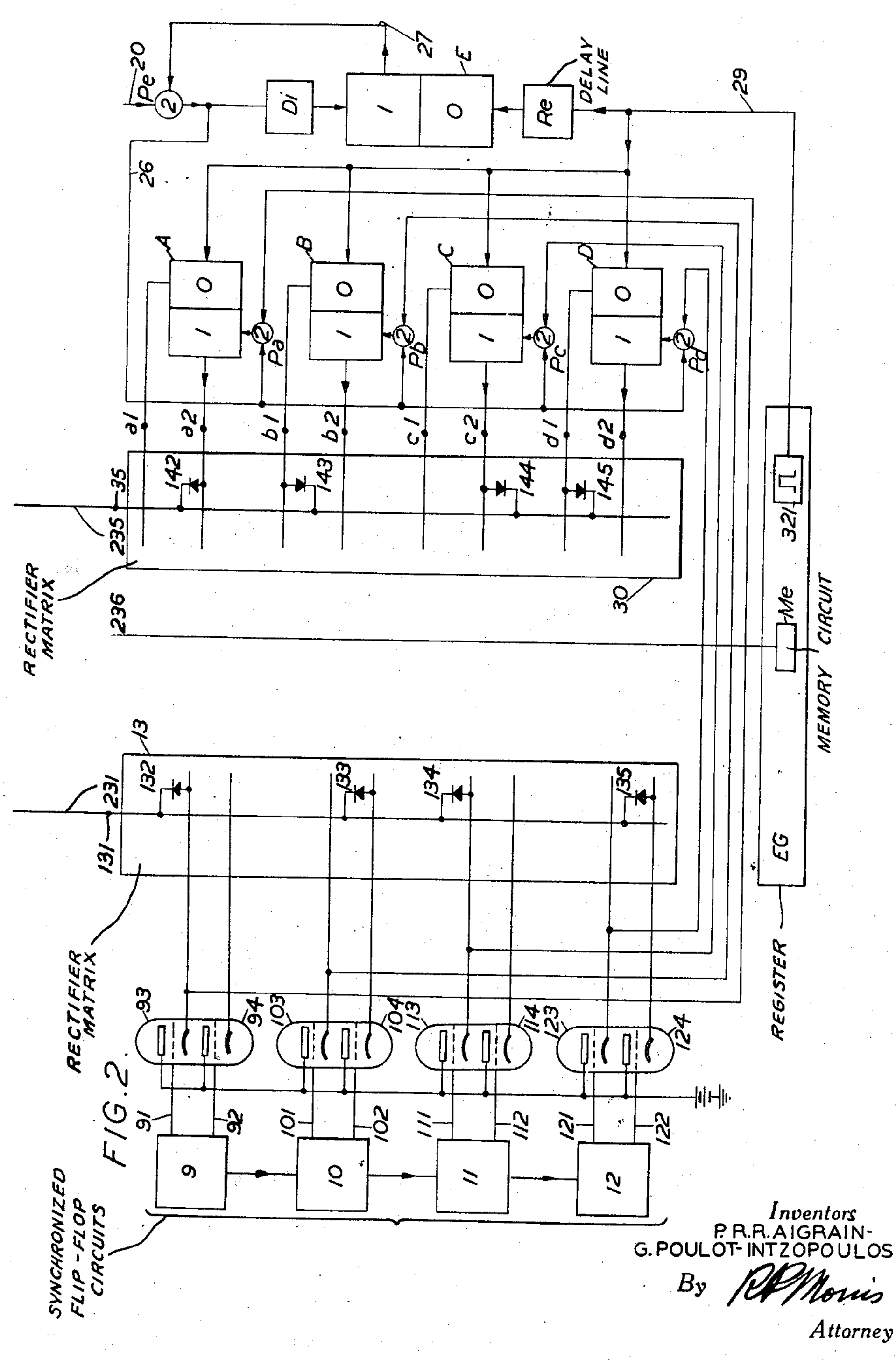
Fig. 2 represents a link circuit selecting circuit.
Figure 3:
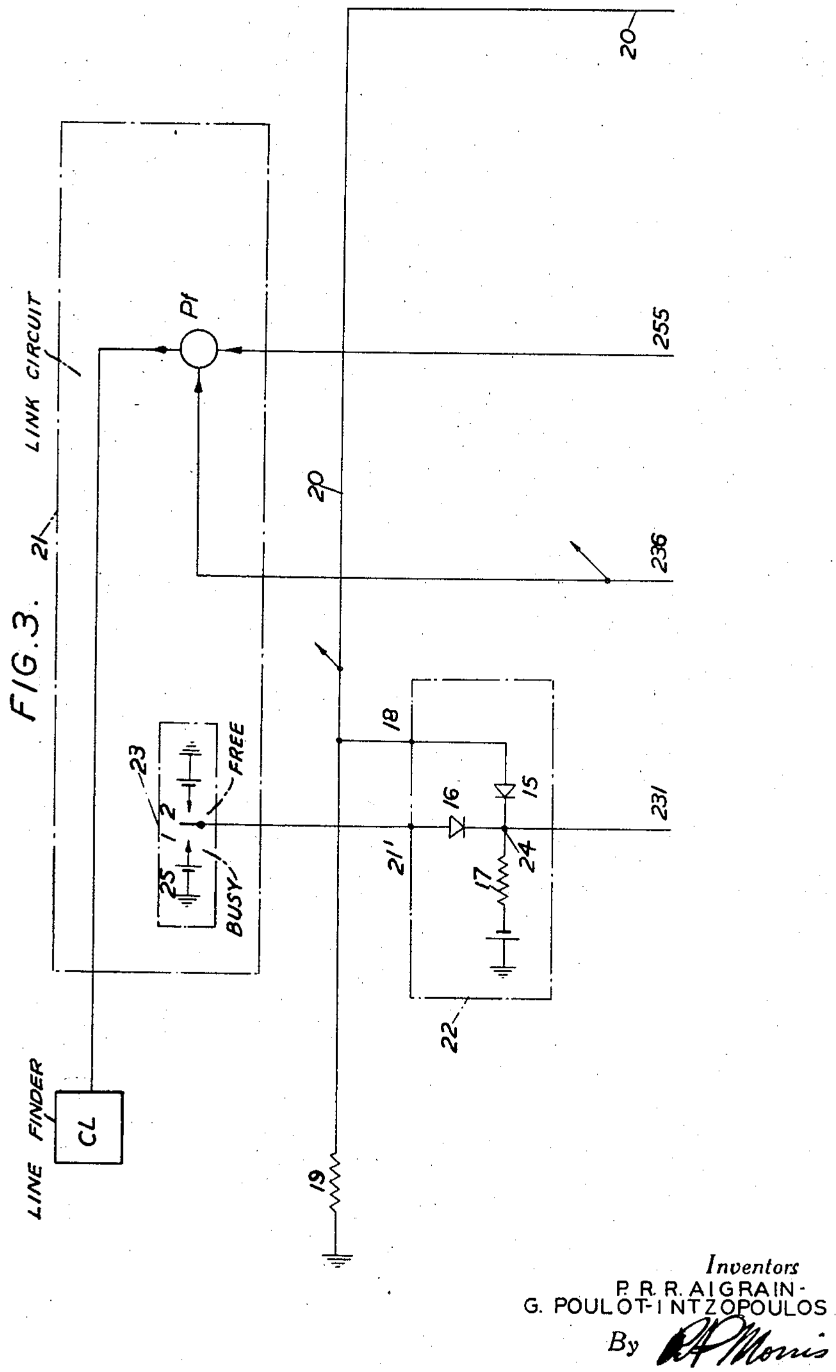
Fig. 3 represents schematically a link circuit.

The device represented on the left hand side of Fig. 2 is provided in order to transmit an impulse for each free link circuit on a line common to all the link circuits, which impulse is in a time-position corresponding to the particular link circuit. In the particular embodiment, 16 link circuits are considered each of which may be reached by the link circuit selecting circuit shown in Fig. 2. There are shown at 9, 10, 11 and 12, four multivibrating or flip-flop circuits giving in their outputs 91–92, 101—102, 111—112, 121—122, opposed polarity voltages which are applied to the control grids of the triodes 93—94, 103—104, 113—114 and 123—124 connected in cathodic load amplifiers (cathode followers). The cathodic load of these triodes is constituted by the inputs of a rectifier matrix 13 of a type analogous to that described in the Proceedings of the Institute of Radio Engineers—February 1949, pages 139 to 147—by Brown and Rochester, and particularly in the upper part of Fig. 2 of this article. The matrix is provided with 16 analogous outputs but only the output 131 is shown which is connected to the cathodes of the tubes 93, 104; 113 and 124 through the rectifiers 132, 133, 134 and 135, respectively. The output 131 (Fig. 2) is connected by the conductor 231 (Figs. 2 and 3) to the common point 24 of the rectifiers 15 and 16 (Fig. 3). The rectifiers 132, 133, 134 and 135 associated with the output terminal 131 constitute with rectifiers 15 and 16 and the resistance 17 an electronic gate 22 normally locked, the output terminal 18 of which is connected to a common charge resistance 19, and to a conductor 20 common to the set of electronic gates, as will be explained later on. The electronic gate which has just been described, and which is shown within the dot and dash frame 22, is associated with the link circuit schematically shown at 21 (Fig. 3). There are 16 analogous electronic gates associated with 16 output terminals of the rectifier matrix 13, all these electronic gates having in common the resistance 19 and the conductor 20. The terminal 21′ of the electronic gate 22 is connected to a switching device shown within a frame 23 drawn in dots and dashes constituting the corresponding link circuit. The switching device which has been shown schematically has a make-before-break contact and is provided in order to apply to the terminal 21′ a positive voltage if the link circuit is busy and a negative voltage if it is free.

Figure 4:
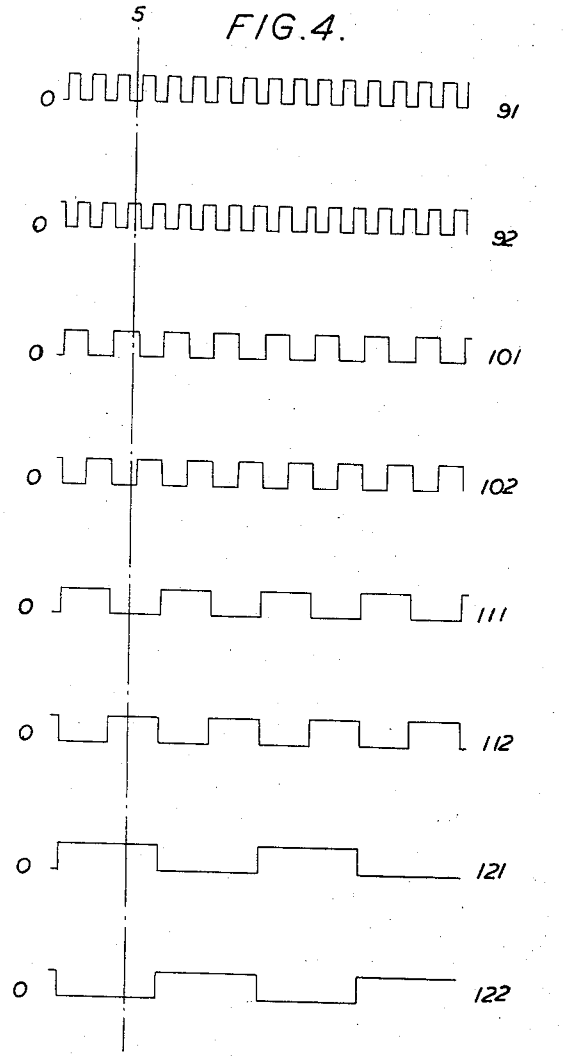
Fig. 4 represents different shapes of waves in different points of Figs. 3 and 4.

There are represented in Fig. 4 the output voltages obtained respectively at the terminals 91—92, 101—102, 111—112, 121—122. In Fig. 4, these wave shapes have been indicated by the same references as the output conductors. When considering the example of the output terminals 131 shown in Fig. 2, it is easy to understand that the point 24 of the electronic gate 22 is negative with respect to ground when the rectifiers 132, 133, 134 and 135 are blocked, that is to say when the conductors 91, 102, 111 and 122 are negative, this taking place in the position 5 in time, in the cycle of impulses shown in Fig. 4, where this position has been represented in dots and dashes and when the switch 23 (Fig. 3) is in the position 2. For all the other positions in time in the cycle, one at least of the rectifiers 132, 133, 134 and 135 is conductive, so that the potential of point 24 is positive with respect to the potential of the battery 25 and the electronic gate is locked. It is then easy to understand that when the link circuit corresponding to an electronic gate is free, that is to say, when the contact 23–2 is closed, one impulse is transmitted on the common line 20 when the code corresponding to a link circuit is applied to the input terminals of the rectifier matrix 13. There is therefore obtained on the line 20 at each scanning cycle one impulse for each free link circuit and this, in the position in time corresponding to this circuit.

On the right hand side of Fig. 2 there is shown the link circuit selecting circuit. In this figure bi-stable circuits have been represented by a rectangle divided into two parts representing the two vacuum tubes which are generally used for constituting such circuits. In the example under consideration, the bi-stable circuits have been indicated by letters A, B, C, and D, the right hand side element being indicated by "0" and the left hand side element by "1." The switching devices known under the name of "electronic gate," have been represented by circles to which are connected a certain number of input and output conductors, these two kinds of conductors being represented by arrows. Besides, there is indicated by means of a numeral within the circle the number of potentials which it is necessary to apply in coincidence in time to this electronic gate in order to obtain a corresponding output impulse. There is also shown in the form of a schematic block 30 a rectifier matrix analogous to that shown at 13 (Fig. 2); this matrix comprises, in a known manner, four pairs of input terminals, *a*1 and *a*2, *b*1 and *b*2, *c*1 and *c*2, *d*1 and *d*2, which correspond to the pairs of output terminals of the circuits A, B, C and D, and 16 output terminals, only the output terminal 35 having been shown in order to simplify the showing. As in the case of Fig. 2, only the rectifiers 142, 143, 144 and 145, corresponding to the output 35, have been shown. At rest, the bi-stable circuits A, B, C and D are in the position in which the right hand side elements are conductive, this corresponding to a positive potential on the output conductors *a*1, *b*1, *c*1, *d*1, the conductors *a*2, *b*2, *c*2, *d*2 being then at a negative potential. These output conductors, in the particular embodiment, are connected to the cathodes of the gas tubes constituting the circuits A, B, C, D. There is applied to the right hand side input terminals of the electronic gates P*a*, P*b*, P*c* and P*d* potentials identical to those indicated in Fig. 4 at 91, 101, 111 and 121. The impulses obtained on the conductor 20 and which characterize the free link circuits are applied to the electronic gate P*e*. At rest, the electronic gate P*e* permits passage of the first impulse applied thereto, on the one hand, towards each one of the electronic gates P*a*, P*b*, P*c* and P*d* through the conductor 26 and, on the other hand, towards the differentiating circuit D*i*. The bi-stable circuit E is provided in order to control the electronic gate P*e* and when the circuit is at rest, it is in a position corresponding to the opening of the electronic gate P*e*. The electronic gates, such as P*a*, are provided in order to apply a control impulse to the corresponding bi-stable circuit, A in the case under consideration, when an impulse is applied simultaneously to their two input terminals. If one considers, for instance, that the first impulse traversing the electronic gate P*e* corresponds to the output 231 of the matrix 13, that is to say, that characterizing the link circuit shown in Fig. 3, it arrives in coincidence with positive impulses respectively applied to the right hand side terminals of the electronic gates P*b* and P*d*, the terminals of the electronic gates P*a* and P*c* being at this moment at a negative potential. Consequently, an impulse is applied to the elements 1 of the bi-stable circuits B and D which pass over to their second stable position. The impulse which traverses the electronic gate P*e* is also applied to the differentiating circuit D*i*, and the trailing edge of this impulse causes the passage of the bi-stable circuit E into its second stable position, so that it applies to the electronic gate P*e*, through the conductor 27, a controlling potential which locks this gate. The potentials obtained at the output terminal of the bi-stable circuits A, B, C, D are applied to the rectifier matrix 30, so that there is obtained a fixed controlling potential at the terminal 35. The controlling potential obtained at the terminal 35 is applied by the conductor 235 to the electronic gate P*f* which is part of the link circuit 21 (Fig. 3); this controlling potential unlocks the electronic gate P*f*, so that the information on the position of the calling line which is registered in a memory circuit shown at M*e* inside the register circuit EG is transmitted by the conductor 236 (Figs. 2 and 3) through the electronic gate P*f* to the line finder circuit CL (Fig. 3). The circuit M*e*, which has been shown inside the register circuit EG, receives the indications on the calling line position by means of the call detecting circuit, which has not been shown. The conductor 236 (Fig. 3) is of course connected to all the electronic gates P*f* of the link circuits to which the register circuit has access. The electronic gates, such as P*f*, of these link circuits are controlled by means of conductors, such as 235, which lead to Fig. 3 at the different output terminals of the rectifier matrix 30. When the register has finished the control of the selections, it causes the freeing of the link circuit selecting circuit, shown in Fig. 2, by applying a positive impulse on the conductor 29 (Fig. 3) from a circuit which has been shown in the form of a schematic block 321, which may be a circuit of any type, adapted for producing a positive impulse when the register has finished the selection operations. This impulse is applied directly to the input terminals of the elements 0 of the flip-flop circuits A, B, C, D, so that the flip-flop circuits which are in the position in which the circuit 1 is conductive, come back to their original condition. Likewise, this impulse is applied through a delay circuit RE in order to cause the flip-flop circuit E to return to its original position in which it unlocks the electronic gate P*e*. The delay circuit is provided in order that the electronic gate P*e* will be opened to allow passage to impulses only when the flip-flop circuits A, B, C and D are back in their rest position. The link circuit is then no longer connected to the register and it is generally maintained in the operative condition under the control of the calling subscriber's loop.

While the principles of the invention have been described above in connection with specific embodiments and particular modifications thereof, it is to be clearly understood that this description is made only by way of example and not as a limitation on the scope of the invention.

What is claimed is:

1. An electronic switching system comprising a register, a plurality of link circuits adapted to be connected to said register, means for applying to each link circuit a train of impulses, each impulse having a particular time position in a cycle of recurring time-position impulses, whereby each link circuit is characterized, a conductor common to said link circuits, means for applying said impulses characterizing free link circuits from said free link circuits to said common conductor, electronic switching means interconnecting said register with said link circuits and connected to said common conductor, and means responsive to an impulse on said common conductor for causing said electronic switching means to connect said register to the particular link circuit characterized by said impulse.

2. An electronic switching system, as defined in claim 1, in which the means for applying a train of impulses to each link circuit comprises a rectifier matrix having a plurality of inlets and a plurality of outlets there being one outlet for each link circuit, sources of recurring impulses of different time duration, means for connecting said sources to the inlets of said rectifier matrix, so as to produce impulses on the outlets of said matrix in succession, means including an individual gate circuit for each outlet for connecting said outlet to the common conductor, and means in each link circuit responsive to the free or busy condition of said link circuit for controlling a particular one of said gate circuits to cause the impulse on the connected matrix outlet to be applied to said common conductor only if said link circuit is free.

3. An electronic switching system, as defined in claim 2, in which the electronic switching means comprises a second gate circuit in each link circuit, means for connecting the register to all said second gate circuits, and means connected to the common conductor and to the means for connecting the sources to the inlets of the rectifier matrix and controlled jointly by an impulse on said common conductor and by the impulses from said connecting means for opening the second gate circuit of the particular link circuit characterized by the impulse on said common conductor.

4. An electronic switching system, as defined in claim 3, further comprising means connected to the common conductor responsive to an impulse received therefrom by the electronic switching means for thereafter blocking the receipt of additional impulses from said common conductor.

5. An electronic switching system, as defined in claim 4, in which the impulse sources are arranged in pairs, each pair producing impulses of opposite polarity, respectively, the impulses being equal in duration and equal to the time between adjacent impulses, the duration of the impulses from said pairs of sources being successively greater, with the duration of an impulse from one pair being twice that of a preceding pair.

6. An electronic switching system, as defined in claim 5, further comprising means in the register for producing a signal at the completion of a selection, means connected to said register and to the means for blocking receipt of additional impulses for rendering said blocking means inoperative upon receipt of said signal from said register.

7. An electronic switching system, as defined in claim 1, in which the electronic switching means comprises a gate circuit in each link circuit, means for connecting the register to all said gate circuits, and means connected to the common conductor and to the means for applying impulses to the link circuit and controlled jointly by an impulse on said common conductor and by impulses from said impulse applying means for opening the gate circuit of the particular link circuit characterized by the impulse on said common conductor.

8. An electronic switching system, as defined in claim 7, further comprising means connected to the common conductor responsive to an impulse received therefrom by the electronic switching means for thereafter blocking the receipt of additional impulses from said common conductor.

9. An electronic switching system, as defined in claim 8, further comprising means in the register for producing a signal at the completion of a selection, means connected to said register and to the means for blocking receipt of additional impulses for rendering said blocking means inoperative upon receipt of said signal from said register.

10. An electronic switching system, as defined in claim 2, in which the impulse sources are arranged in pairs, each pair producing impulses of opposite polarity, respectively, the impulses being equal to the time between adjacent impulses, the duration of the impulses from said pairs of sources being successively greater, with the duration of an impulse from one pair being twice that of a preceding pair.

References Cited in the file of this patent

UNITED STATES PATENTS

| | | |
|---|---|---|
| 2,678,354 | De Hertog | May 11, 1954 |
| 2,773,934 | Trousdale | Dec. 11, 1956 |

FOREIGN PATENTS

| | | |
|---|---|---|
| 1,030,550 | France | Mar. 11, 1953 |